(12) United States Patent
Picard et al.

(10) Patent No.: US 7,385,148 B2
(45) Date of Patent: *Jun. 10, 2008

(54) MODULAR RACEWAY

(75) Inventors: Richard R. Picard, West Hartford, CT (US); Mark W. Makwinski, Cromwell, CT (US)

(73) Assignee: The Wiremold Company, West Hartford, CT (US)

( * ) Notice: Subject to any disclaimer, the term of this patent is extended or adjusted under 35 U.S.C. 154(b) by 67 days.

This patent is subject to a terminal disclaimer.

(21) Appl. No.: 11/296,903

(22) Filed: Dec. 8, 2005

(65) Prior Publication Data

US 2006/0117684 A1 Jun. 8, 2006

Related U.S. Application Data

(60) Provisional application No. 60/634,308, filed on Dec. 8, 2004.

(51) Int. Cl.
H02G 3/08 (2006.01)
H02G 3/04 (2006.01)
E04C 2/52 (2006.01)

(52) U.S. Cl. .................... 174/481; 52/220.1; 52/220.2; 174/68.3; 174/68.1

(58) Field of Classification Search .............. 52/220.1, 52/220.2, 220.3, 220.5, 220.7; 174/481, 174/68.1, 68.3, 95, 72 A
See application file for complete search history.

(56) References Cited

U.S. PATENT DOCUMENTS

| | | | |
|---|---|---|---|
| 594,998 A | 12/1897 | Lyle | 174/72 R |
| 4,874,322 A * | 10/1989 | Dola et al. | 52/239 |
| 5,614,695 A * | 3/1997 | Benito Navazo | 52/220.5 |
| 6,180,878 B1 | 1/2001 | Gretz | 174/48 |
| 6,259,020 B1 | 7/2001 | Ashline et al. | 174/48 |
| 6,284,975 B1 | 9/2001 | McCord et al. | 174/49 |
| 6,323,421 B1 | 11/2001 | Pawson et al. | 174/48 |
| 6,335,484 B1 * | 1/2002 | Jarry et al. | 174/480 |
| 6,342,675 B1 | 1/2002 | DeBartolo et al. | 174/50 |
| 6,355,880 B1 * | 3/2002 | Bateson et al. | 52/220.3 |
| 6,362,420 B1 | 3/2002 | Bacouelle et al. | 174/48 |
| 6,384,336 B1 | 5/2002 | VanderVelde et al. | 174/95 |
| 6,437,247 B1 * | 8/2002 | Holliday | 174/101 |
| 6,646,203 B1 * | 11/2003 | Liao | 174/97 |
| D484,469 S | 12/2003 | Thibault | D13/184 |
| 6,664,467 B1 | 12/2003 | de la Borbolla | 174/48 |
| D486,130 S | 2/2004 | Thibault | D13/184 |
| 6,756,544 B2 | 6/2004 | Handler | 174/68.1 |
| 6,768,050 B2 * | 7/2004 | Lockard | 174/28 |
| 6,936,766 B1 | 8/2005 | Galasso | 174/48 |
| 7,075,010 B2 * | 7/2006 | Santelli, Jr. | 174/72 R |

FOREIGN PATENT DOCUMENTS

DE 3925010 A1 * 1/1991
JP 2005229775 8/2005

* cited by examiner

*Primary Examiner*—Jeanette Chapman
*Assistant Examiner*—Elizabeth A Plummer
(74) *Attorney, Agent, or Firm*—McCormick, Paulding & Huber LLP

(57) ABSTRACT

This invention relates generally to a modular raceway system having raceway cover components of predetermined length fitted to wall brackets at predetermined intervals along a wall structure, some of which wall brackets are designed to provide a space or gap between the adjacent end portions of the raceway covers so as to receive electrical outlet/data ports at these locations for the wall support brackets, thereby avoiding the necessity for interrupting continuous cover components, thereby lending a more pleasing appearance to the overall installation.

9 Claims, 7 Drawing Sheets

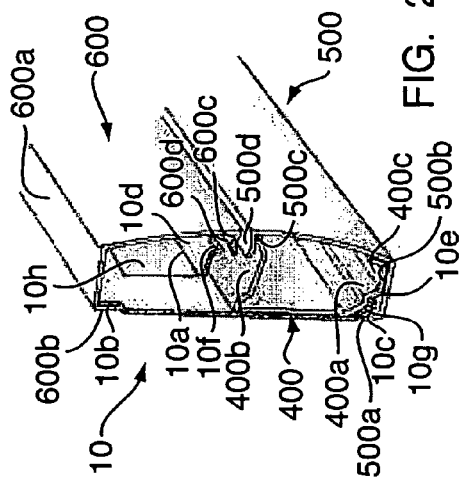
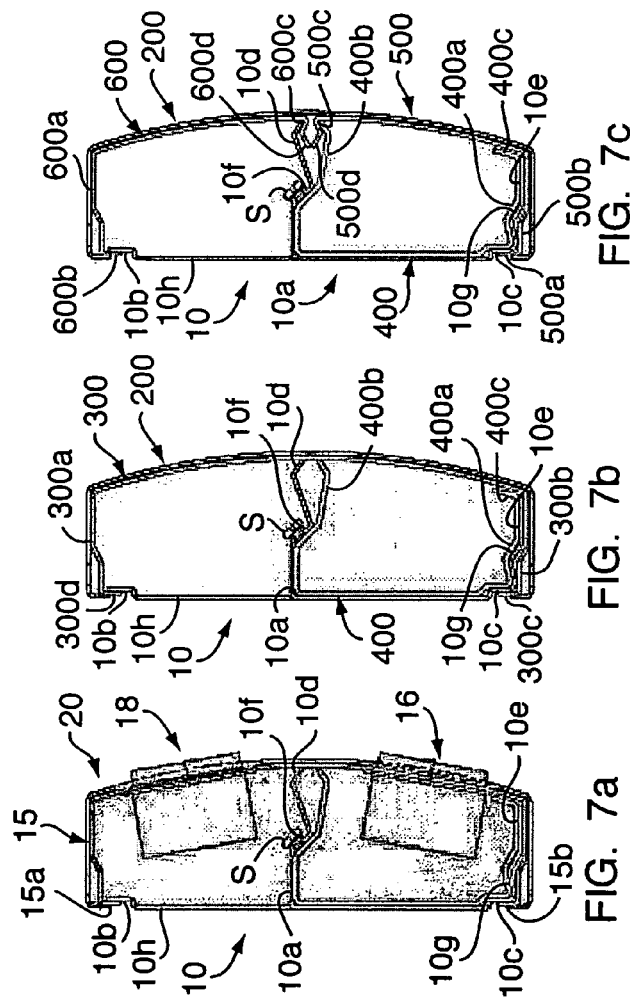

MODULAR RACEWAY

CROSS REFERENCE TO RELATED APPLICATIONS

This application claims the benefit of and incorporates by reference essential subject matter disclosed in U.S. Provisional Patent Application No. 60/634,308 filed on Dec. 8, 2004 entitled "Modular Raceway".

TECHNICAL FIELD

This invention relates generally to a modular raceway systems.

SUMMARY OF THE INVENTION

This invention relates generally to a modular raceway system having raceway cover components of predetermined length fitted to wall brackets at predetermined intervals along a wall structure, some of which wall brackets are designed to provide a space or gap between the adjacent end portions of the raceway covers so as to receive electrical outlet/data ports at these locations for the wall support brackets, thereby avoiding the necessity for interrupting continuous cover components, thereby lending a more pleasing appearance to the overall installation.

The invention also provides for minimizing the need for raceway base channels, that match these cover components, such raceway base components being required only to form the wireway that houses power lines or other high voltage cables. Data and communication wiring of the low voltage variety is accommodated in adjacent wireways defined in large part by the wall itself, and enclosed by the elongated covers of predetermined length.

Another feature of the invention resides in the flexibility afforded in so called one piece raceway to form the support wireways for communication/data lines, low voltage wireways, support covers and enclosed wireway.

Still another feature of the present invention can be attributed to the unique configuration for the raceway covers whereby these covers include rearwardly projecting flanges that are adapted to be received by relieved top and bottom marginal edge portions of the support brackets. Gaps are provided at the support brackets for receiving device brackets which are also formed to fit the brackets. This unique configuration allows for outlet devices to be mounted not only in the front facing surface of the device bracket as in present day raceways, but also allows for the placement of outlet devices, including lamps, in the rearwardly projecting flanges of these device brackets. The brackets are mounted to the wall support brackets, which support brackets also support the end portions of the raceway covers, so as to define gaps in the covers to receive the device brackets.

The device brackets described in the preceding paragraph are configured to receive conventional outlet devices, ports and lamps as mentioned, and are fitted with device bracket covers. These device bracket covers have the same internal contour as the external contour of the raceway covers so as to overlie the raceway cover end portions, and thereby avoid the need for precisely cutting these raceway covers, as is characteristic of present day two piece metal and plastic raceway generally.

BRIEF DESCRIPTION OF THE DRAWINGS

FIG. 2a is an assembled view of the components of the present invention.

FIGS. 6a and 6b also show a unique arrangement for accommodating at least one wiring device in the lower flange of the device bracket, and also shows a plurality of device bracket cover configurations for use in a modular raceway system in accordance with the present invention.

FIGS. 7a, 7b and 7c are sectional views through a modular raceway system in accordance with the present invention as compared to a convention 4000 series raceway of the type sold by the Wiremold Company of West Hartford, Conn. It will be noted that the conventional 4000 series raceway is of the so-called two piece metal raceway configuration, having a continuous base and raceway cover mated therewith, the cover having inturned flanges that mate with forwardly projecting flanges on the raceway base. The embodiments shown illustrate the invention, and the need for a contiguous raceway cover and raceway base components, with longitudinally spaced wall brackets that in turn support the raceway cover by rearwardly projecting flanges on the cover. Inturned lips on the covers are received in relieved marginal top and bottom edge portions of the wall brackets to support the covers in the absence of a continuous raceway base.

FIG. 8 is a sectional view through a prior art modular raceway system.

DETAILED DESCRIPTION OF THE DRAWINGS

Figure 1:
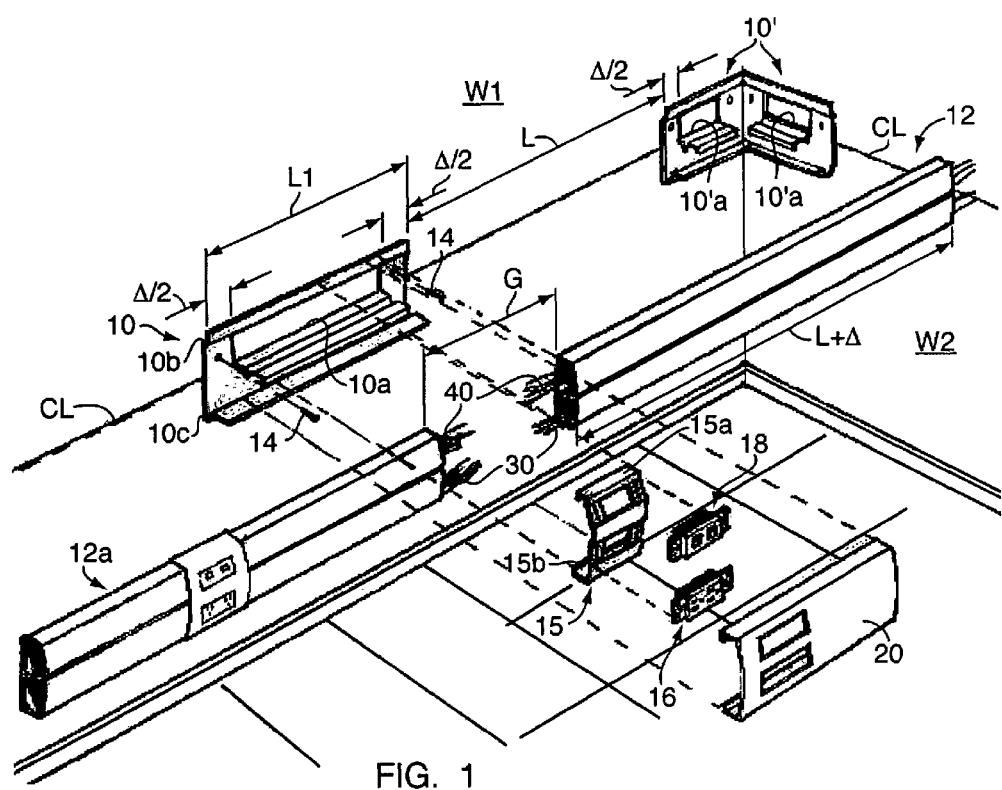
FIG. 1 is an exploded perspective view showing the various components of the present invention as they might appear relative to a wall structure.

Considering FIG. 1 in greater detail, a wall structure is indicated generally at W1 and W2 and defines an internal corner. The generally flat vertical walls are fitted with a modular raceway system in accordance with the present invention by placing mounting plates or wall mounting brackets, such as that shown at 10,10' at spaced intervals along the wall W1 simply by providing a chalk line CL that is used to align the spaced mounting brackets 10,10'. The chalk lines can be located at the opening lower edge 10a, 10'a in each of these brackets.

Modular raceway sections or assemblies, such as that indicated generally at 12, can be prefabricated, and will therefore have a predetermined length so as to exceed slightly (L plus Δ) the distance L between longitudinal spaced mounting brackets 10,10'. In fact these raceway sections overlap these wall mounting brackets a distance of Δ/2 so as to be conveniently mounted thereto. While the wall mounting brackets 10,10' are preferably secured to walls W1,W2 by mounting screws such as indicated at 14, the modular raceway sections 12,12a can be conveniently secured to these wall mounting brackets without the necessity for such fasteners in a manner to be described in greater detail hereinafter.

The raceway sections 12 and 12a are provided so that end portions of the raceway sections 12 and 12a define a gap G therebetween. This gap G is slightly less than the longitudinal dimension L1 of the wall mounting bracket 10 so as to provide for the necessary overlap, Δ, to support the raceways sections.

In accordance with the present invention this gap G is utilized to provide a convenient location for accommodating a device bracket, such as that indicated at 15. The device bracket 15 includes upper and lower marginal edges defining rearwardly formed flanges 15a and 15b that are designed to be snap fit upon assembly with the wall mounting support bracket 10. The wall mounting support bracket 10 defines relieved upper and lower marginal edges 10b,10c that receive these flanges 15a and 15b, and more particularly that receive the down turned lips on each device bracket 15 as will be described in greater detail hereinafter.

Outlet devices such as shown at 16 and 18 are mounted to the device bracket, and a device bracket cover 20 is configured to be received by the end portions of the raceway sections 12 and 12a, and to overly these end portions to hide any uneven cut required on these raceway sections 12 and 12a.

As suggested in FIG. 1 the raceway assemblies 12 and 12a are designed to be snapped together and are preferably fabricated in predetermined lengths (between 4 and 8 feet in length) and can be mounted to the wall mounting bracket 10 and nevertheless slid (side to side) so as to fit the wall, without the need for any cutting. Although these raceway sections are shown with wiring provided in their separately defined wireways, such a preassembly is not required, and instead the raceway covers can be separated until after installation of the wiring, following which the covers can be snapped in place in the manner to be described in greater detail hereafter.

Thus, the raceway sections 12 and 12a are illustrated in exploded relationship, after accomplishment of the forgoing steps and preparatory to installing the outlet devices 16 and 18 to the wires 30 and 40 provided in the separate wireways in accordance with conventional practice.

The final step in the process is snapping the device bracket cover 20 in place to afford an essentially tamperproof wireway installation that is designed to require a proprietary tool (not shown) for removal, and for access to the wiring in the raceway channels, or wireways.

Figure 2:
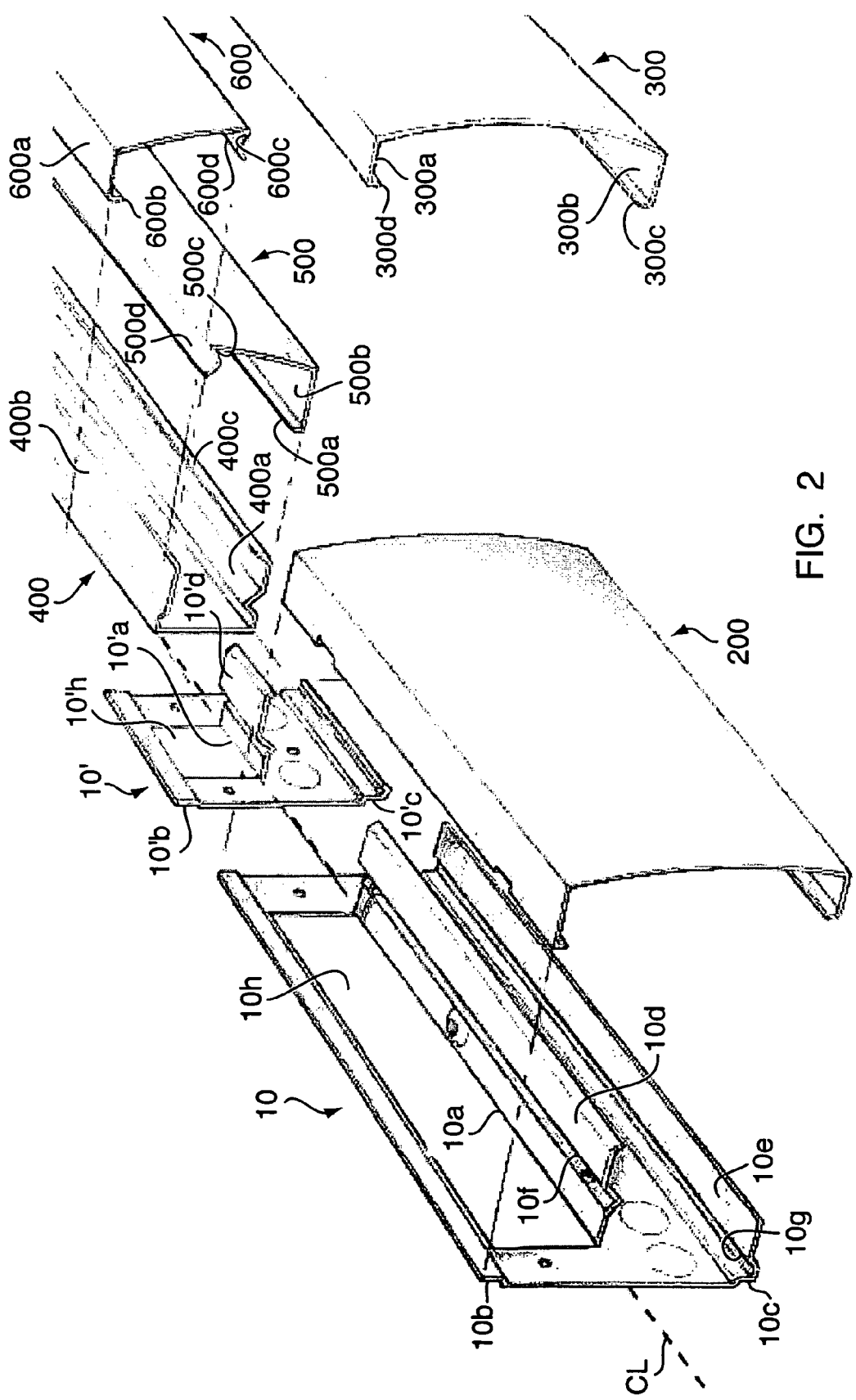
FIG. 2 is an exploded view of these components showing in greater detail the relationship between various components of a modular raceway system in accordance with the present invention.

As shown in FIG. 2, the wall mounting bracket 10 can be provided in different sizes, but preferably is approximately 12 inches in length so as to readily accommodate a single row or stack of outlet devices such as described previously with reference to FIG. 1. Nevertheless, a 2-foot wall mounting bracket can be utilized where the need exists for fitting the standard predetermined length raceway sections 12,12a to a wall of such length that it is not readily divisible by the standard predetermined 4 to 8 foot length sections supplied to the installer. Thus, the gap G provided between the adjacent raceway sections 12 and 12a can be varied significantly. Another feature of the invention resides in the fact that a relatively smaller or shorter length wall mounting bracket 10' might be used in the event no outlet devices, or outlet device bracket, is necessary between two adjacent raceway sections. In such case the gap G will be short enough to be readily spanned by a bracket cover of even shorter length than that illustrated at 200 in FIG. 2. The bracket cover 200 is designed to accommodate a gap between the adjacent raceway sections of larger size and length and can be used by the installer to make up the raceway to fit wall segments that may not be long enough to accommodate the standard predetermined raceway sections described previously.

Still with reference to FIG. 2, a power raceway channel 400 is shown that is designed to be received between forwardly projecting flanges 10d and 10e defined for this purpose in the wall mounting bracket 10. The forwardly projecting flange 10d has a v-shaped notch 10f which cooperates with a wall segment on upper flange 400b on power channel 400 and forwardly projecting flange 10e has a raised portion 10g which cooperates with a v-shaped notch 400a on lower flange 400c to support the power channel 400 in a snap fit assembly adjacent the spaced end portions of the power channel as best seen in FIGS. 2a and 7c. This snap fit arrangement affords ease of assembly for the installer, and avoids the need for fasteners. The smaller support or mounting bracket indicated generally at 10' is also provided with a flange 10'd, and the bottom marginal edge of this smaller bracket 10' is designed to support the rear corner of the forwardly open power channel 400. The upper flange 10'd like the flange 10d for the bracket 10 is integrally formed with the bracket as indicated by the opening 10h in the bracket 10, and the opening 10'h in the bracket 10'.

The power channel 400 is forwardly open, defining a channel for receiving the power cables (not shown). Upper and lower flanges 400b and 400c thereof cooperate with rearwardly projecting flanges of a raceway cover 500 to span only the power channel. The cover 500 is a snap-fit on the power channel 400 by reason of the raceway cover 500 top and bottom flanges being spread during assembly so as to fit over the power channel flanges 400b and 400c. An upturned lip 500a on the cover 500, defined at the trailing edge of the lower flange 500b fits within the relieved area 10c defined for this purpose on the wall mounting bracket 10. The forwardly projecting marginal edge of the flange 400b is received in the V-shaped notch 500c defined between the top flange 500d of the raceway cover 500 and the front surface of said cover.

A top raceway cover 600 has a rearwardly projecting flange 600a with a downturned lip 600b to be received in the relieved area 10b of the wall mounting bracket 10. The forwardly projecting marginal edge of the upper flange 10d is received in a v-shaped notch 600c defined between a lower flange 600d and the front surface of the cover 600. The entire assembly is best illustrated in FIG. 2a. The wall mounting bracket 10 having it's forwardly projecting flange 10d provided between its upper and lower marginal edges, to cooperate with a lower flange 10e so as to receive the power channel therebetween. The top and bottom raceway covers 600 and 500 respectively are shown assembled with the wall mounting bracket 10, each having a top and a bottom lip, 600b and 500a respectively, as well as adjacent interlocking portions 600c and 500c respectively, to form a unitary structure once assembled.

Still with reference to FIG. 2, it is a feature of the present invention that only the wireway which is intended to accommodate the power lines need have a back wall, and the wireway which accommodates the data/communication wiring can be configured without any need for a back wall. As an alternative to the two-piece raceway cover 500,600 a one-piece cover is show in phantom line at 300. The raceway cover 300 in FIG. 2 has upper and lower marginal edges defining rearwardly projecting flanges 300a and 300b, with upturned and downturned lips 300c and 300d respectively, designed to be received in the relieved areas 10b and 10c defined for this purpose in the wall mounting bracket 10. As mentioned previously only the end portions of the raceway cover 300 are received in these relieved areas, and a gap G is purposefully provided at the wall mounting bracket 10 to receive a device bracket, and device bracket cover, all as described previously with reference to FIG. 1.

Thus, two different raceway configurations are illustrated in FIG. 2, one having a single raceway cover 300 spanning both wireways, most useful where both wireways are used for communication or data cables for low voltage. More common perhaps would be the need for providing a wireway capable also of accommodating higher voltage wiring, in such case the elongated power channel 400, equal in length to the raceway section 12 in FIG. 1, is first assembled with the wall mounting brackets 10,10'.

Figure 3:
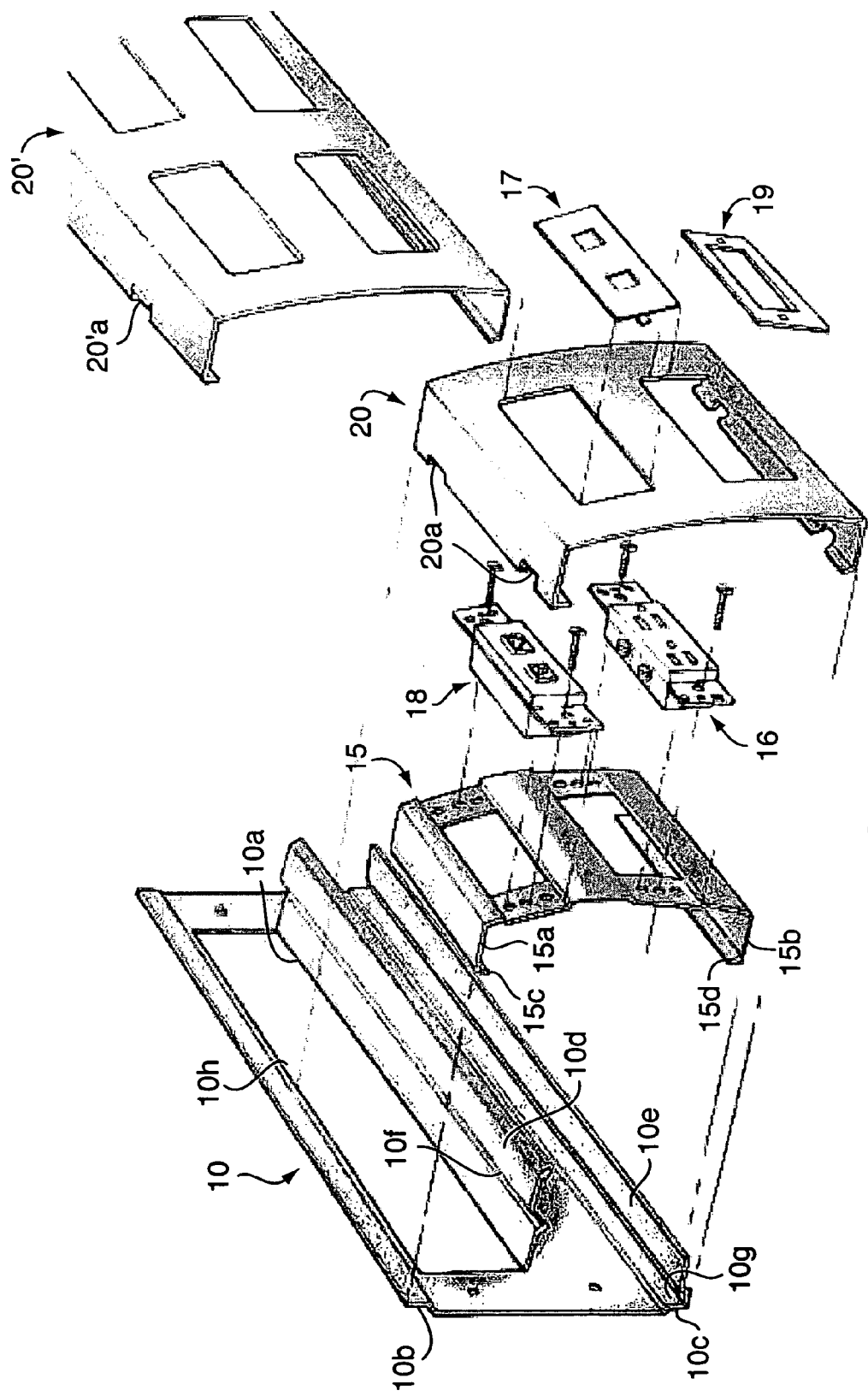
FIG. 3 is an exploded view showing in still greater detail the assembly process for mounting a device bracket to a wall bracket so that outlet devices can be provided in the device bracket, and covered by a device bracket cover.

FIG. 3 shows the device bracket 15 which is assembled with the wall mounting bracket 10, and more particularly in the gap defined for this purpose between the adjacent raceway sections 12 and 12a (reference FIG. 1) as well as the devices 16 and 18 (also referenced in FIG. 1). The device bracket 15 includes rearwardly projecting flanges 15a and 15b that define inturned lips 15c and 15d respectively. These lips are shaped to be received in the relieved regions 10b and 10c, of wall mounting bracket 10, again for a convenient snap fit assembly therewith, that avoids the need for screw fasteners or the like.

The device bracket cover 20, which is used where a device bracket 15 is accommodated on the wall mounting bracket 10, necessarily requires that openings be defined to provide access to outlet devices 16 and 18. Finally, device faceplates 17 and 19, finish the installation. These faceplates may also be snap fit, or in the alternative rely upon screw fasteners for installation. An alternative device bracket cover 20' is also shown in FIG. 3, and it is a feature of the device bracket covers 20,20' that notches 20a,20'a are provided in an unobtrusive design that will allow a special tool (not shown) to be inserted in the notches for disassembly of these device covers only as a result of utilizing such a tool for this purpose, and thereby avoiding unauthorized access to the raceway interior.

Figure 4:
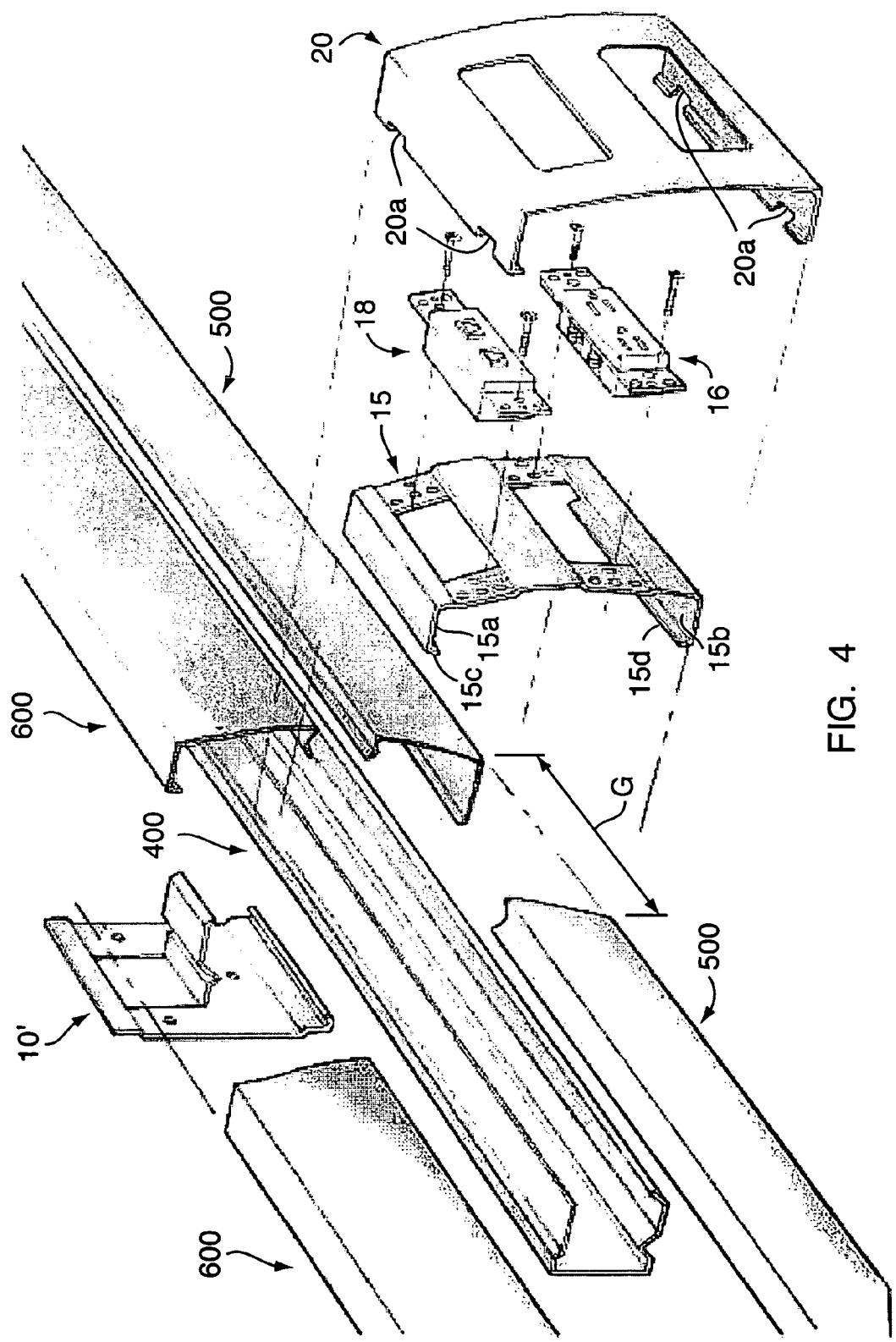
FIG. 4 is an exploded view showing the components illustrated in FIG. 3 but also including other components in a modular raceway installation having separate upper and lower raceway covers to enclose the wireways which are provided for the data/communication cables and separately for the power lines.
Figure 5A:
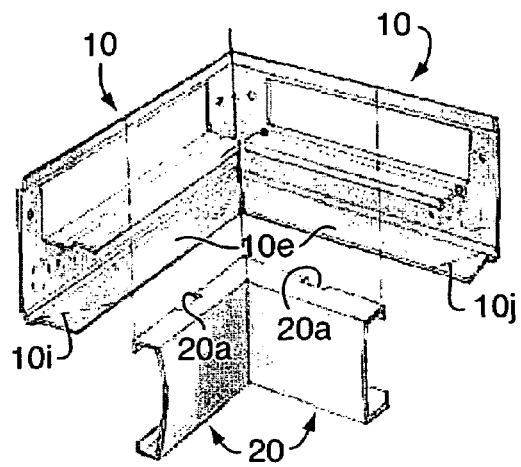
FIGS. 5a, 5b, 5c, 5d and 5e show the arrangements for fabricating in the field a corner wall bracket from standard parts, some of which may be identical or similar to those used along the wall itself. Also shown are internal and external raceway corner cover components for use with these corner support brackets.
Figure 5C:
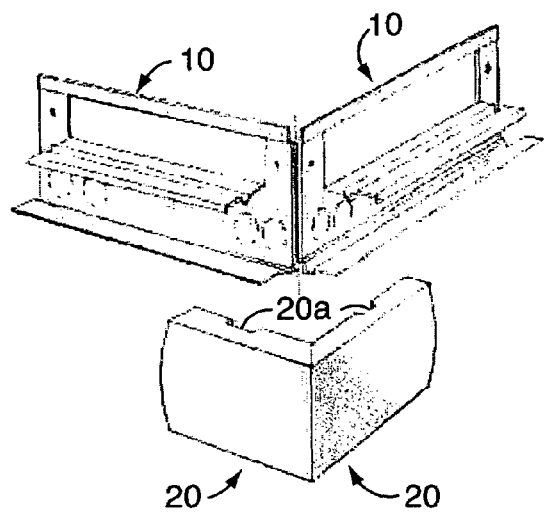
Figure 5B:
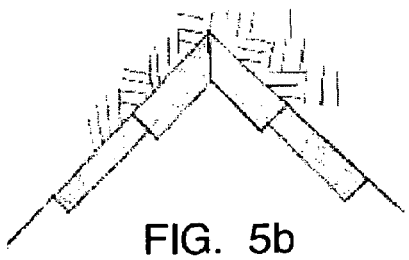
Figure 5D:
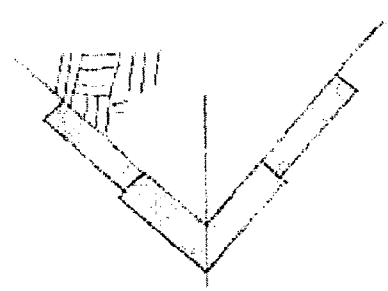
Figure 5E:
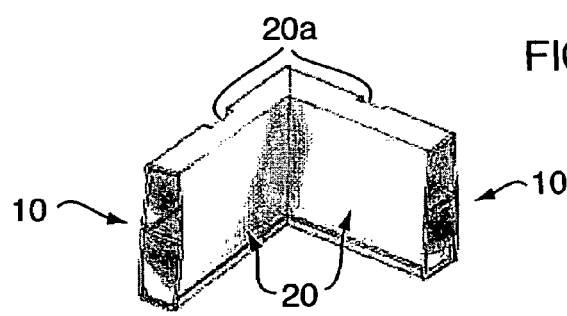

FIG. 4 shows the relative dimensional relationship between the various components of the present invention, and shows how each of these components can be slid together upon assembly with one another, either upon installation, or removal, or in retrofitting a particular raceway installation with the split cover arrangement shown.

This view also illustrates the dimensional range for the gap G, between the raceway cover components (4.5. to 6 inches) and shows that these raceway cover segments need be "rough-cut" only to allow the device bracket to fit between these cover end portions. The device bracket cover 20 is designed to overlie the raceway cover components with the internal contour of the raceway cover 20 conforming to the external contour of the raceway cover segments or components, hiding the "rough-cut" raceway cover end portions.

FIGS. 5a-5e are intended to illustrate another novel feature of the modular raceway system in accordance with the present invention, whereby installations can be conveniently made in spite of minor variations in the perpendicularity of the walls defining both the internal and external corners of the room.

Wall mounting brackets 10, 10 are preferably used in pairs to form these internal and external corners and in the case of the internal corners lines of weakening 10i, 10j or break off tabs are provided in the wall mounting bracket flange 10e for this purpose. It will also be apparent that fabricating these internal and external corner brackets in the field, as shown in FIGS. 5a-5e, will lead to ease of installation of a kind not possible with prior art raceway configurations, particularly with present day raceways that rely on special fittings for running two-piece raceway around internal and external corners.

Still with reference to FIGS. 5a-5e, the raceway cover configuration can be seen to employ the same individually paired wall mounting brackets to support the raceway covers, and the relatively simple process of angle cutting the rearwardly projecting flanges of the cover components can lead to a finished appearance for the resulting installation that is not possible with prior art raceway installations generally.

Figures 6A, 6B:
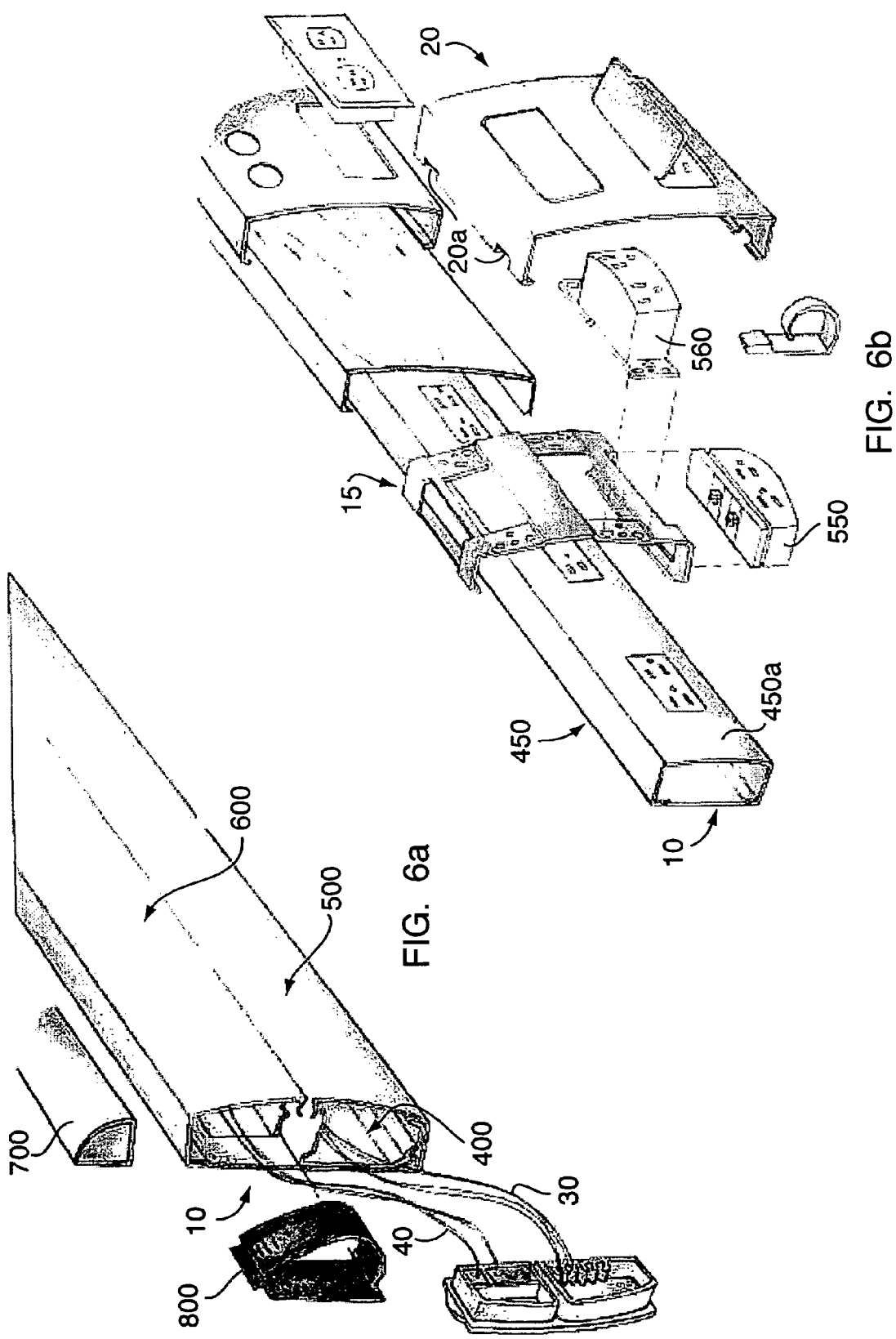
FIGS. 6a and 6b are exploded views illustrating the end configuration for a typical modular raceway system in accordance with the present invention, and also illustrates an optional trim piece for accommodating additional wiring at the top of the raceway cover, as well as a prewired multiple outlet device raceway consisting of a base and a cover that might be accommodated in place of the base components to define the power wireway at the bottom of the modular raceway system.

FIGS. 6a and 6b illustrates additional features of the modular raceway system of the present invention. An optional trim piece 700 can accommodate additional wiring, and can be adhered to the top flange of the raceway cover system described previously.

A polymeric wire holder 800 is provided of such a size that it can be received in the space which defines the wireway for the data and communication wiring.

Where the raceway will be preassembled at the factory, wiring holders that also serve as bumpers during shipment can be fabricated from a polymeric material and serve to hold the various assembled components of the raceway system in place during transit, and even during installation, further facilitating the installers task upon installation of a raceway such as described here. FIG. 6b also illustrates a further embodiment of the present invention where prewired multiple device raceway 450 can be accommodated in one or the other of the two wireways in the event outlet plugs are desired intermediate the spaced wall mounting brackets. As shown, a PLUGMOLD style raceway is installed in the upper wireway, and is designed for retention by the wall mounting brackets 10. As shown this PLUGMOLD raceway has its own prefabricated raceway cover 450a. Other preassembled components can be accommodated, such as the raised outlet devices indicated at 550 in FIG. 6b. Specially fabricated devices such as those shown at 550 and 560 are designed to project through the openings provided for this purpose in the device bracket cover 20, increasing the number of electrical outlet plugs in each such device.

FIG. 8 illustrates a typical prior art 4000 series two piece raceway having continuous base raceway channel and continuous cover components fitted thereto, as presently offered by The Wiremold Company of West Hartford, Conn., United States.

FIG. 7a is a section view taken through a mounting bracket location to illustrate the installation of a device bracket, and device bracket cover together with the devices supported in that device bracket. This view also illustrates a convenient grounding arrangement in the form of a screw S, which is threadably received in the forwardly projecting flange in the wall mounting bracket, and grounds the wall mounting bracket to the forwardly open power channel 400. This particular view shows a single raceway cover rather than the split raceway cover design that is the subject of FIG. 4.

FIG. 7b shows the single cover configuration through a section of the assembled raceway section at a device mounting bracket attached to a wall mounting bracket.

Finally, FIG. 7c shows a section through the raceway, similar to FIG. 7b but illustrating the split cover raceway, configuration such as that illustrated in FIGS. 2 and 4.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A modular raceway system comprising:
    a plurality of elongated raceway assemblies, some raceway assemblies having elongated base and cover components and being prewired with cables provided therein,
    a plurality of support brackets for mounting to an existing wall at longitudinally spaced intervals along the wall, some of said support brackets having top and bottom marginal edges, said raceway assemblies having end portions received by said support bracket top and bottom marginal edges such that said raceway assembly end portions are spaced apart to provide access to cables prewired in said raceway assemblies, and support bracket covers having the same internal contour as the external contour of said raceway cover components for overlying said cover component end portions and said support bracket covers spanning said spaced cover component end portions.

2. The modular raceway system according to claim 1, further including corner brackets adapted for attachment to the wall structure, each corner bracket being made up from said support brackets to provide said corner bracket in a configuration such that it can be assembled at installation for use at an external or internal corner of the wall structure.

3. The modular raceway system according to claim 1, wherein some said raceway assemblies define at least one wireway that does not have a base so that the wall structure itself serves to define the back wall of such one wireway.

4. The modular raceway system according to claim 1 further inducing device brackets secured to selected support brackets between said raceway assembly end portions, and selected device bracket covers to overlap said spaced end portions of said raceway assemblies.

5. The modular raceway system according to claim 4 further including other support brackets having transition flanges for receiving transversely oriented transverse raceway to be introduced to at least one wireway of said raceway system, said transverse raceway being similar or different in cross sectional configuration to that of said raceway system.

6. The modular raceway system according to claim 1 wherein said raceway assemblies further comprise prewired raceway assemblies with spaced outlet plugs prepositioned therein, and said prewired raceway subassemblies serving to define one of at least two wireways of said raceway system.

7. A modular raceway system comprising:
    a plurality of support brackets for attachment to a wall structure,
    elongated raceway assemblies, each raceway assembly having end portions adapted to engage complementary portions of the support brackets, said elongated assemblies including upper and lower L-shaped cover components that together form a general U-shaped cross-sectional configuration with marginal edge portions of said upper and lower cover components engaging said support brackets
    at least one electrical device mounting bracket adapted to be mounted to said support bracket in a gap between adjacent end portions of said raceway assemblies, and
    a device bracket cover having the same internal contour as the external contour of said elongated raceway assembly end portions for overlying the same, and having an opening for a device provided in said device bracket.

8. A modular raceway system comprising:
    a plurality of support brackets for attachment to a wall stucture,
    elongated raceway assemblies, each raceway assembly having end portions adapted to engage complementary portions of the support brackets,
    at least one electrical device mounting bracket adapted to be mounted to said support bracket in a gap between adjacent end portions of said raceway assemblies, and
    a device bracket cover having the same internal contour as the external contour of said elongated raceway assembly end portions for overlying the same, and having an opening for a device provided in said device brackets,
    wherein said raceway cover components are generally L-shaped, said support bracket having a forwardly projecting central flange between the top and bottom marginal edges thereof, and wherein said L-shaped covers have marginal edge portions for engaging said top and bottom marginal support bracket edges respectively, said central flange of said support bracket serving to engage the adjacent marginal edge portions of said L-shaped cover components, said L-shaped cover components being provided one above the other in said modular raceway.

9. The modular raceway of claim 7, wherein said raceway cover components are slidably received on said support brackets to allow longitudinal adjustments in the gap between raceway covers at said support bracket.

* * * * *